United States Patent [19] [11] Patent Number: 5,939,213
Bowden et al. [45] Date of Patent: Aug. 17, 1999

[54] TITANIUM MATRIX COMPOSITE LAMINATE

[75] Inventors: David Michael Bowden, St. Louis; Donald Albert Deuser, Florissant, both of Mo.

[73] Assignee: McDonnell Douglas

[21] Appl. No.: 08/471,940

[22] Filed: Jun. 6, 1995

[51] Int. Cl.⁶ .................................. C22C 1/09; B32B 5/02
[52] U.S. Cl. ............................................. 428/608; 428/614
[58] Field of Search ..................................... 428/608, 549, 428/627, 614; 148/421

[56] References Cited

U.S. PATENT DOCUMENTS

| | | | |
|---|---|---|---|
| 3,615,378 | 10/1971 | Bomberger et al. | 75/175.5 |
| 3,717,443 | 2/1973 | McMurray et al. | 29/191.4 |
| 3,991,928 | 11/1976 | Friedrich et al. | 228/190 |
| 4,309,226 | 1/1982 | Chen | 148/12.7 B |
| 4,415,375 | 11/1983 | Lederich et al. | 148/11.5 F |
| 4,782,884 | 11/1988 | Siemers | 164/46 |
| 4,809,903 | 3/1989 | Eylon et al. | 228/194 |
| 4,896,815 | 1/1990 | Rosenthal et al. | 228/120 |
| 4,944,914 | 7/1990 | Ogawa et al. | 420/418 |
| 4,978,585 | 12/1990 | Ritter et al. | 428/614 |
| 4,981,643 | 1/1991 | Siemers et al. | 419/17 |
| 5,017,438 | 5/1991 | Siemers et al. | 428/614 |
| 5,045,407 | 9/1991 | Ritter | 428/614 |
| 5,185,045 | 2/1993 | Peters et al. | 148/671 |
| 5,222,282 | 6/1993 | Sukonnik et al. | 29/17.9 |
| 5,298,095 | 3/1994 | Russo et al. | 148/670 |
| 5,354,615 | 10/1994 | Tenhover et al. | 428/366 |
| 5,362,441 | 11/1994 | Ogawa et al. | 420/420 |
| 5,363,554 | 11/1994 | Partridge et al. | 29/889.71 |
| 5,403,411 | 4/1995 | Smith et al. | 148/514 |
| 5,417,779 | 5/1995 | Griebel et al. | 148/421 |
| 5,426,000 | 6/1995 | Labib et al. | 428/547 |
| 5,431,874 | 7/1995 | Gigliotti | 420/418 |
| 5,447,680 | 9/1995 | Bowden | 419/4 |
| 5,486,242 | 1/1996 | Naka et al. | 148/422 |

OTHER PUBLICATIONS

O'Neal, et al. "TEM Studies of Interfacial Chemistry . . . " in Microstructural Science, vol. 18, pp. 383–393. (no month 1990).

Bowden et al., "Influence of β Phase Stability . . . " in Scripta Metallurgica, vol. 26, pp. 913–917 (no month 1992).

*Primary Examiner*—John J. Zimmerman
*Attorney, Agent, or Firm*—Dale B. Halling

[57] ABSTRACT

A titanium matrix composite laminate (42) includes alternating layers of a titanium matrix foil (12) and a fiber mat (14). The titanium matrix foil (12) is formed from a super alpha titanium alloy having a beta phase stabilizer equivalency of at least thirteen. The beta phase stabilizer is selected from the elements molybdenum, vanadium, niobium, tantalum, halfnium, tungsten or some combination thereof. The fiber mat (14) is formed of silicon carbide (SiC) and has a carbon coating. Once a layup (16) of the alternating layers is formed, it is placed in a mold (22). Heat and pressure are then applied in a step called consolidation (40). The result is a titanium matrix composite laminate (42).

17 Claims, 3 Drawing Sheets

TITANIUM MATRIX COMPOSITE LAMINATE

FIELD OF THE INVENTION

The present invention relates generally to titanium matrix composite laminates and more particularly to super alpha titanium matrix composite laminates and methods for making the laminates.

BACKGROUND OF THE INVENTION

Titanium matrix composite (TMC) laminates have been heralded as the structural material for advanced aerospace applications. TMCs are essentially alternating layers of a titanium alloy foil matrix and a fiber mat. The fiber mat can be made from continuous silicon carbide (SiC) fibers or aluminum oxide ($Al_2O_3$) fibers or titanium boride (TiB) fibers or silicon nitride ($Si_3N_4$) fibers. The factors in choosing a particular fiber are: 1) commercially availability; 2) fiber strength; 3) coefficient of thermal expansion (CTE) match; and 4) chemical compatibility. All four fibers have acceptable fiber strength and CTE match. However the aluminum oxide fibers, and the titanium boride fibers result in reaction products that are brittle. The silicon nitride fibers react violently with the titanium, eating away at the fibers and reducing their strength.

The titanium alloys used to make the foil matrix are characterized by the phases of the foil alloy after a consolidation process. The phases of the alloy after consolidation fall into three categories, alpha (α-hexagonal close packed structure), beta (β-body center cubic), and alpha-2 ($Ti_3Al$ precipitates). Those alloys that result in alpha and beta phases have strength properties that are too low for advanced aerospace applications and a low temperature limit. Pure beta alloys looked promising, having high strength characteristics. Unfortunately, pure beta alloys oxidize too quickly.

Thus there exists a need for a TMC laminate in which the titanium alloy has good strength properties, has a high temperature limit and is not brittle. The fiber used in the TMC must be chemically compatible and commercially available. Further there is a need for a method of making TMC laminates using an improved titanium alloy.

SUMMARY OF THE INVENTION

A titanium matrix composite laminate that satisfies these requirements includes a fiber mat and a titanium matrix alloy foil, having an alloy composition comprising, titanium, and aluminum in a predetermined relationship to a beta stabilizer. In a preferred embodiment the beta stabilizer is selected from the set of molybdenum, vanadium, niobium, tantalum, tungsten or some combination thereof. In another embodiment the beta stabilizer satisfies the equation:

$$1X_{Nb}+3.27X_{Mo}+2.4X_V \geq 13$$

where $X_{Nb}$ is the weight percentage of niobium $X_{Mo}$ is the weight percentage of molybdenum $X_V$ is the weight percentage of vanadium.

A method for forming the titanium matrix composite laminate involves the steps of: forming a titanium matrix foil, having a fixed weight percentage of a beta stabilizer; forming a fiber mat; alternately layering the titanium matrix foil and the fiber mat to a predetermined thickness, forming a layup; placing the layup in a mold; and applying pressure and heat to the layup.

BRIEF DESCRIPTION OF THE DRAWINGS

FIG. 2b is an expanded view of the micrograph of FIG. 2a;

FIG. 3b is an expanded view of the micrograph of FIG. 3a.

DETAILED DESCRIPTION OF THE DRAWINGS

Figure 1:
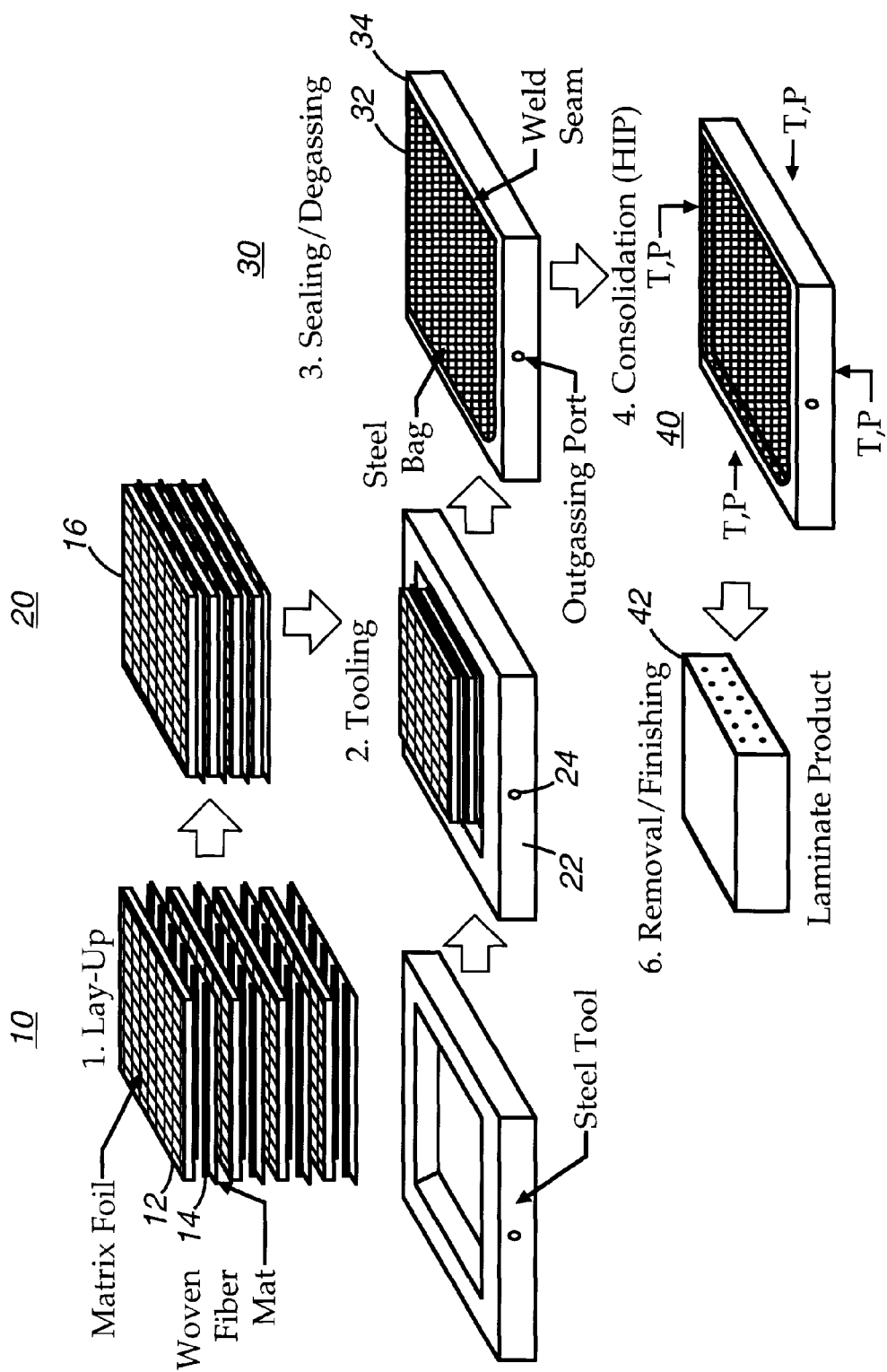
FIG. 1 is a perspective view of a process of consolidation of a titanium matrix composite laminate.

FIG. 1 shows a process for forming titanium matrix composite laminates. The first step 10 involves layering a titanium alloy matrix foil 12 alternately with a woven fiber mat 14. The woven fiber mat 14 has fibers of for instance SiC. These fibers run roughly parallel to each other. The fiber mat 14 can be layered such that all the fibers in the first and subsequent layers are running the same direction. Alternatively the fiber mats 14 can be layered so that the second layer's fibers are perpendicular to the first layer's fibers. The rotation can be less than ninety degrees and many other combinations can be postulated. The reason for changing the direction of the fibers of the layered mats 14, is that the fibers are strongest in the direction of the fiber. By rotating the direction of the fibers the resulting TMC laminate will have approximately uniform strength properties.

When the desired number of layers is reached a stack or layup 16 is formed. The second step 20 involves placing the layup 16 into a mold or tool 22. The tool 22 has a vent 24 for outgassing. The third step 30 involves attaching a steel bag 32 over the stack and to a top surface 34 of the tool 22. The next step 40, called consolidation, is to apply heat and pressure to the layup 16, resulting in a laminate 42 or surface. In an alternative process the heat is applied in a vacuum and the pressure is provided by a press or mallet.

A super alpha alloy containing alpha and beta phases and alpha-2 precipitates promised to be strong, oxidization resistant and not too brittle. Using the rule of mixtures it was calculated that a TMC laminate made from such a titanium alloy and the SiC fiber should have a strength of at least 240 ksi (thousand psi or 1680 Kpa). The rule of mixtures' states that in a metal matrix composite, both fibers and matrix contribute to the strength of the composite based on the relative volume fraction of fiber and matrix. For example, a titanium metal matrix composite using the Ti-8.5Al-5Nb-1Mo-1V-1Zr (Ti-8.5,5,1,1,1) alloy as a matrix containing 40 volume percentage silicon carbide fibers would have a tensile strength calculated by the rule of mixtures as:

Composite strength=0.4(550 ksi)(0.8)+0.6(170 ksi)=278 ksi (1946 kpa).

Where:

0.4=volume fraction of fibers 0.8=bundle strength 0.6=volume fraction of matrix alloy 550 ksi=fiber tensile strength 170 ksi=alloy tensile strength.

Figure 2A:
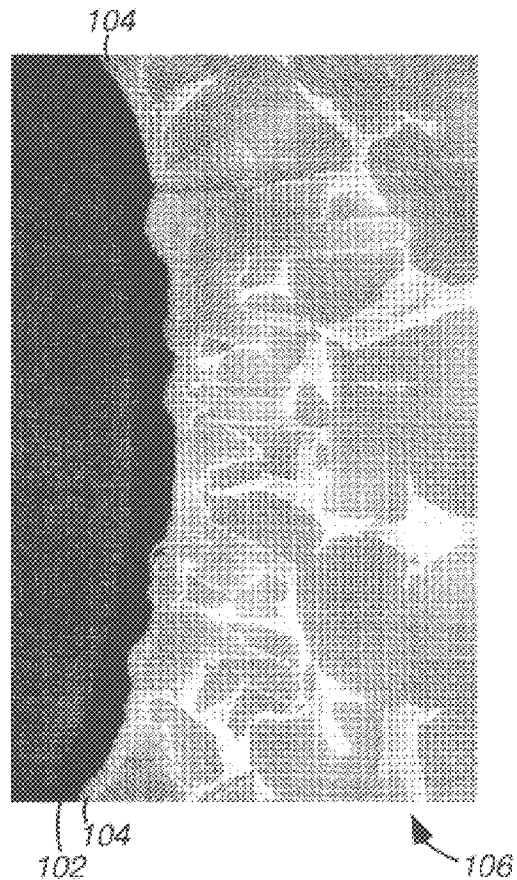
FIG. 2a is a micrograph of a fiber foil interface of a first titanium alloy.
Figure 2B:
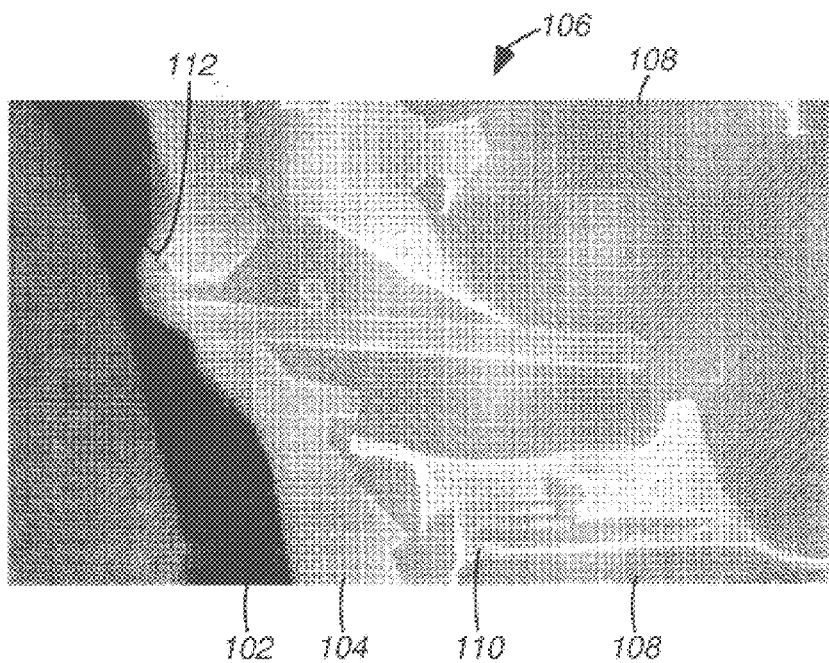

A titanium alloy, Ti-8.5Al-5Nb-1Mo-1V-1Zr (Ti-8.5,5,1,1,1), having alpha and beta phases and alpha-2 precipitates was used to form a matrix foil 12. A SiC fiber was used to produce the fiber mat 14. From these a laminate 42 was produced. When this laminate was tested it was found to have strength properties significantly lower than the predicted 240 ksi. This appeared to be another dead end for TMC laminates. FIGS. 2a and 2b show a micrograph of the fiber-alloy (Ti-8.5,5,1,1,1) interface. The micrograph was taken using a scanning electron microscope (SEM). FIG. 2a has a magnification of ¾ inch equals 10 microns and FIG. 2b is a view of FIG. 2a, with a magnification of 2 inches equals 10 microns. The far left of the micrographs is the SiC fiber 100 and the dark area next to the SiC fiber 100 is a carbon coating 102 put on the exterior of the SiC fiber 100 to protect the fiber. A white border 104 defines the edge of the titanium alloy foil 106. The majority of the titanium alloy foil 104 is made up of alpha phase material 108 and shows up as a darker gray. The beta phase material 110 shows up as bright white spots. As can be seen clearly in FIG. 2b a notch 112 has penetrated the carbon coating 102 of the SiC fiber 100. These notchs 112 are charaterized by a needle growth 114. These notchs 112 will continue to grow right into the fiber 100 under high temperatures. In addition, having penetrated the carbon coating 102 the notch acts as a stress concentration site on the SiC fiber 100. These stress concentration sites result in microfractures of the fiber 100, when the laminate is placed under stress. The microfractures and penetrations weaken the TMC laminate. A TMC laminate made with this titanium alloy is unsuitable for aerospace applications. However, the needles 114 never grow through the beta phase material 110. Thus, if the beta phase material in the titanium alloy could be increased, the needle growth 114 could be supressed. This would surpress or eliminate the harmful notchs 112.

The relative volume fractions of alpha and beta phases are controlled by the alloy chemistry. Aluminum (Al) is an alpha phase stabilizer up to six percent by weight. Above six percent by weight aluminum results in alpha-2 precipitates. Beta phase stabilizers include molybdenum, vanadium, niobium, tantalum and tungsten. Beta phase stabilizers can be characterized by the percentage weight of the beta phase stabilizer required to form 100 percent beta phase material. A convenient way of characterizing these materials is in relation to niobium (Nb). Niobium (Nb) of one percent weight has a beta phase stabilizer equivalency of one. Vanadium (V) is 2.4 times as effective as a beta phase stabilizer as niobium and thus one percent by weight of vanadium (V) has a beta phase stabilizer equivalency of 2.4. Similarly, molybdenum (Mo) is 3.27 times as effective as a beta phase stabilizer as niobium.

Figure 3A:
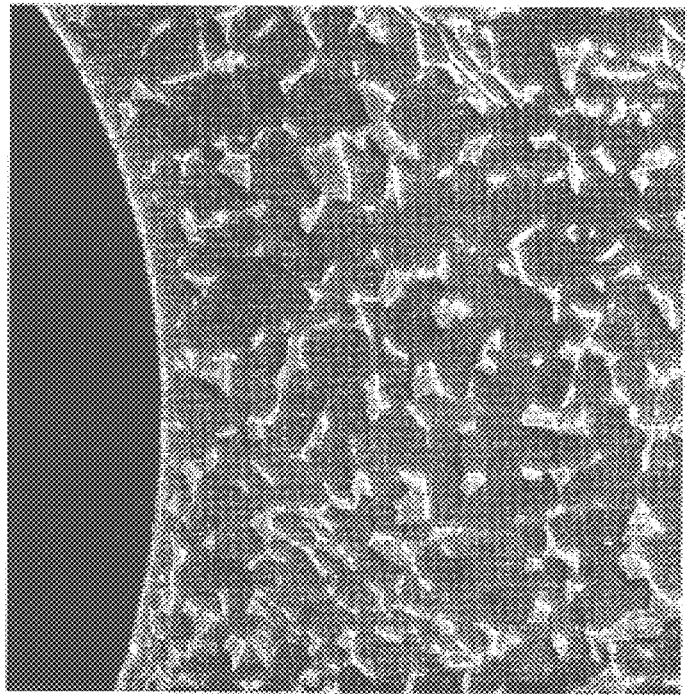
FIG. 3a is a micrograph of a fiber foil interface of a second titanium alloy.
Figure 3B:
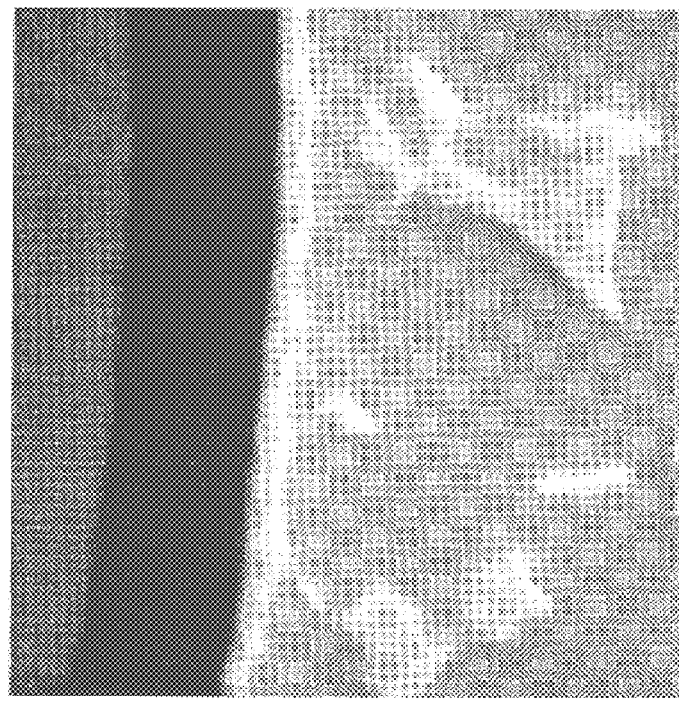

A titanium alloy with a sufficiently high beta phase stabilizer equivalency would inhibit the growth of the needles 114 and therefor the dangerous notchs 112. A thirty percent increase in the beta phase stabilizer equivalency, should prevent needle 114 and notch growth 112. FIGS. 3a and 3b are micrographs of a TMC laminate with a titanium alloy foil of Ti-8Al-8Nb-1Mo-1V (Ti-8811). The beta phase stabilizer equivalency of this alloy is calculated using the equation below:

$$1X_{Nb}+3.27X_{Mo}+2.4X_{V} = \text{beta phase stabilizer equivalency}$$

where $X_{Nb}$ is the weight percent of niobium
$X_{Mo}$ is the weight percent of molybdenum
$X_{V}$ is the weight percentage of vanadium.

$$8*1+1*3.27+1*2.4 = 13.67 \text{ beta phase stabilizer equivalency}$$

FIGS. 3a and 3b are micrographs of a TMC laminate produced with the titanium alloy Ti-8811. As can be seen in FIGS. 3a and 3b there is an absence of harmful needle growth and notchs. Thus the strength of the TMC laminates made with this titanium alloy will have a strength closer to that predicted by the rule of mixtures.

A process for forming a TMC laminate having good strength properties, a high temperature limit and that is not brittle, involves forming a titanium alloy with a beta phase stabilizer equivalency of at least thirteen. The titanium alloy should be a super alpha alloy to insure adequate strength and oxidation resistance. However, the amount of alpha-2 precipitates should be no more than necessary to provide the needed strength. Excessive alpha-2 precipitates will result in a brittle alloy (low ductility). A desirable range of alpha-2 precipitates forms when the weight percentage aluminum is between six and eight. In one embodiment the titanium alloy conforms to the equation;

$$1X_{Nb}+3.27X_{Mo}+2.4X_{V} \geq 13$$

where $X_{Nb}$ is the weight percentage of niobium
$X_{Mo}$ is the weight percentage of molybdenum
$X_{V}$ is the weight percentage of vanadium.

The process requires a titanium alloy foil meeting these requirements. The alloy foil is alternatively layered with a fiber mat, forming a layup. In one embodiment the fiber mat is made from SiC fibers having a carbon coating. Next, the layup is placed in a mold and heat and pressure are applied. This is called "consolidation" and it transforms the layup into the TMC laminate.

There has been described a TMC laminate and method for making the laminate that has adequate strength properties, a high temperature limit and that is not brittle. While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. A titanium matrix composite laminate comprising:
a fiber mat; and
a titanium matrix alloy foil, having a super alpha alloy composition comprising titanium, aluminum and a beta stabilizer.

2. The titanium matrix composite laminate of claim 1, wherein the beta stabilizer is selected from the group consisting of molybdenum, vanadium, niobium, tantalum, tungsten or some combination thereof.

3. The titanium matrix composite laminate of claim 1, wherein the super alpha alloy composition comprises seven to eight weight percent aluminum.

4. The titanium matrix composite laminate of claim 3, wherein the beta stabilizer has a beta phase stabilizer equivalency of at least 13.

5. The titanium matrix composite of claim 3, wherein the beta stabilizer includes niobium and the niobium is at least thirteen weight percent of the alloy composition.

6. The titanium matrix composite of claim 3, wherein the beta stabilizer includes vanadium and the vanadium is at least five and four tenths weight percent of the alloy composition.

7. The titanium matrix composite of claim 3, wherein the beta stabilizer includes molybdenum and the molybdenum is at least four weight percent of the alloy composition.

8. The titanium matrix composite laminate of claim 3, wherein the beta stabilizer is selected from a group of elements consisting of: niobium, molybdenum, and vanadium, and a group of element have the relationship defined by the following equation:

$$1X_{Nb}+3.27X_{Mo}+2.4X_{V}>13$$

where
$X_{Nb}$ is the weight percent of niobium
$X_{Mo}$ is the weight percent of molybdenum
$X_{V}$ is the weight percent of vanadium
weight percentages are measured against the super alpha alloy.

9. The titanium matrix composite laminate of claim 8, wherein the fiber mat comprises fibers of silicon carbide.

10. The titanium matrix composite laminate of claim 9, wherein the fibers have a carbon coating.

11. A titanium matrix composite laminate comprising:
a super alpha alloy including titanium and aluminum and a beta stabilizer; and
a fiber mat.

12. The titanium matrix composite laminate of claim 11, wherein the aluminum has a weight percentage of seven to eight of the alloy.

13. The titanium matrix composite laminate of claim 11, wherein the beta stabilizer has a beta stabilizer phase equivalency of at least 13.

14. The titanium matrix composite laminate of claim 12, wherein the beta stabilizer is selected from the group of elements consisting of molybdenum, vanadium, niobium, tantalum, tungsten or some combination thereof.

15. The titanium matrix composite laminate of claim 12, wherein the beta stabilizer is niobium in a weight percentage of at least thirteen of the alloy.

16. The titanium matrix composite laminate of claim 12, wherein the beta stabilizer is vanadium in a weight percentage of the alloy of at least 5.42.

17. The titanium matrix composite laminate of claim 12, wherein the beta stabilizer is molybdenum in a weight percentage of the alloy of at least 3.976.

\* \* \* \* \*